Figure 1:
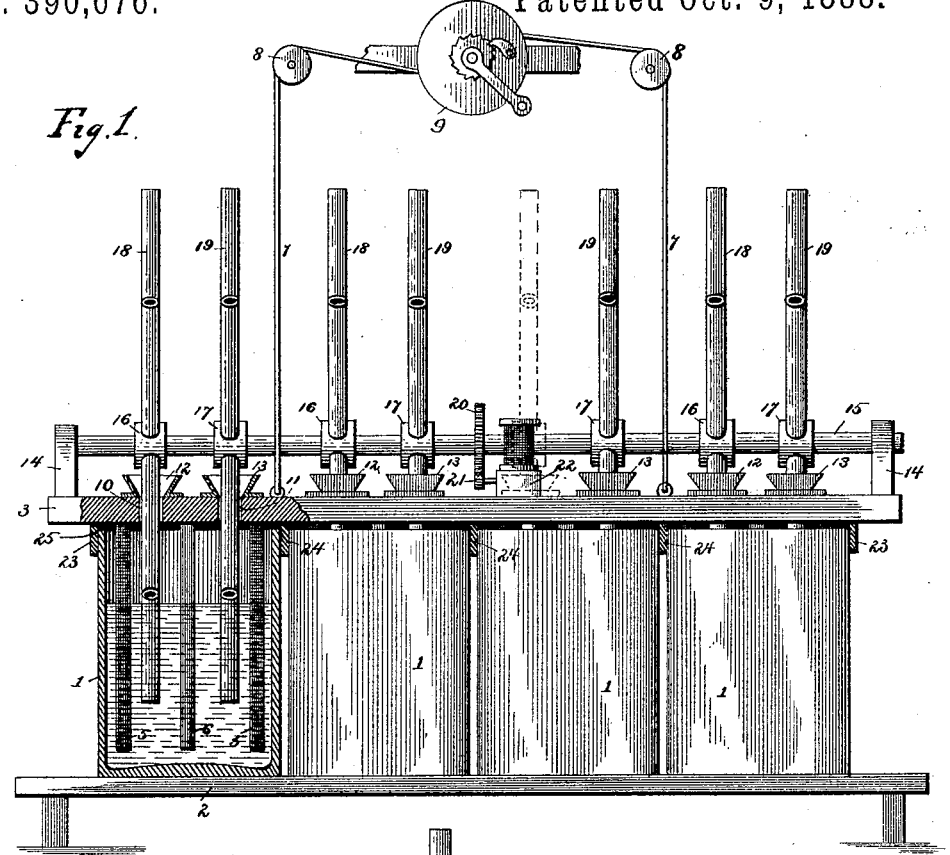

(No Model.)

D. HUMPHREYS.
GALVANIC BATTERY.

No. 390,676. Patented Oct. 9, 1888.

WITNESSES.
Edwin L. Yewell
John Enders Jr.

INVENTOR.
David Humphreys.
by Robt H Read
his Attorney

UNITED STATES PATENT OFFICE.

DAVID HUMPHREYS, OF CINCINNATI, OHIO.

GALVANIC BATTERY.

SPECIFICATION forming part of Letters Patent No. 390,676, dated October 9, 1888.

Application filed March 9, 1888. Serial No. 266,740. (No model.)

*To all whom it may concern:*

Be it known that I, DAVID HUMPHREYS, a citizen of the United States, residing at Cincinnati, in the county of Hamilton and State of Ohio, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to galvanic batteries of that type in which the excitant is agitated and the electrodes are kept free from gases of electrolytic decomposition and salts which may obstruct its action by such agitation. It has heretofore been proposed to rotate the carbon or negative electrodes of batteries so as to alternately bring the negative surface into and out of the exciting-liquid. It has also been proposed to keep the exciting-liquid of uniform composition by stirring said liquid during the operation of the battery by mechanical means.

In prior applications filed by me and numbered 266,307, filed March 6, 1888, and 266,524, filed March 8, 1888, I have described several forms of apparatus by which the excitant may be kept of uniform composition and the polarizing-gases dislodged or reduced. In one of these applications the battery-cells were rocked bodily; in another an agitating device was reciprocated in the excitant in such a way as to dislodge the polarizing-gas and force currents or bubbles of air against the electrodes, to which said gas adheres.

My present invention relates more particularly to the ends designed to be accomplished in the latter application, and embodies a different form of apparatus.

My invention consists in rotating, partly in the liquid and partly in the air, light devices which will mechanically remove the gas from a fixed negative electrode surface; also, in entrapping air by said rotating devices and liberating the same in the body of the excitant, so as both to chemically reduce the polarizing-gas and assist in the agitation.

My invention embodies, also, certain structural details, which will be hereinafter fully described in this specification, and then definitely indicated in the appended claims.

Figure 2:
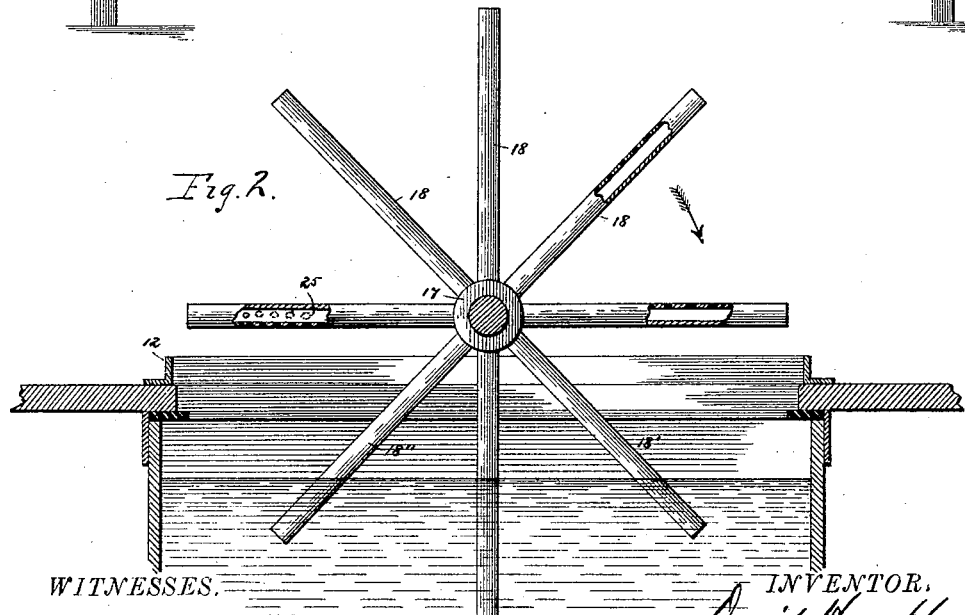

In the accompanying drawings, which illustrate my invention, Figure 1 is an elevation, partly in section, of my apparatus. Fig. 2 is a sectional view through one of the cells, taken on a plane passing between the electrodes.

My invention is applicable to any number of cells. Four are shown in the drawings. 1 1 1 1 represent these cells.

2 is any suitable support on which the apparatus and cells may be mounted. A cover, 3, common to all of the cells is provided. To this cover is firmly secured the positive and negative electrodes 6 and 5, 5 corresponding to each cell. The positive or soluble electrode is preferably of zinc and the negative or conducting electrodes of carbon. The former is located between two of the latter, so as to secure a large negative surface. These electrodes are provided with circuit-connections and switches for coupling, which are not shown to avoid confusion in the illustration. To the cover 3 is attached cords 7 7, passing over guide-pulleys 8 8 and fastened to a windlass, 9, so that by means of said windlass the electrodes may be raised out of the cells or lowered into the same. The cover 3 is provided with two wide slots, 10 11, over each cell, and these slots are provided with flaring mouths 12 13, for a purpose which will presently appear. On supports 14 14, mounted on the cover, is trunnioned a shaft, 15, and collars or hubs 16 17 are firmly fixed to the shaft in vertical alignment with the slots in the cover. In these hubs are fixed tubular rods 18 19, a series of these rods radiating from each hub, as shown in Fig. 2.

Centrally on the shaft 15 is secured a large gear-wheel, 20, which co-operates with a pinion, 21, actuated by the armature of an electric or other motor, 22. An electric motor is shown in the drawings, and may be actuated by a branch current from the battery itself or by a current derived from a separate source. The gear-wheels 20 21 should be so proportioned as to size and number of teeth that a slow rotary movement will be given to the shaft 15. On the under side of the cover 3 is a box, 23, provided with partitions 24 and suitable gaskets or packing, 25, to make a tight joint when the cover is down and prevent the excitant from splashing over the edges of the cells. The rods 18 19 are of such a length that they will cover in their travel most of the electrode-surface, and the slots in the cover and the hubs on the shaft are so located as to bring the rods close to the negative or carbon surface. It will be seen upon inspection of the drawings that there is a series of these rods for each negative electrode. If but one such electrode were used, but one set of rods need be provided. Each rod is perforated for a distance from its outer end about equal to the depth of immersion with a series of small holes, as shown in Fig. 2. These holes are bored on the side which would be uppermost on entering the excitant.

The rods should be made of a material which will be unaffected by the excitant used in the battery, and should be light in weight. Hard rubber is a good material for the purpose.

The operation will now be understood.

The electrodes are raised out of the cells and fresh fluid supplied. A good fluid is a composition of bichromate of potash or soda, sulphuric acid, and water, the salt being dissolved in the water to saturation and the acid added to the desired strength. The electrodes are then lowered into position and the motor started. The rods 18 18 19 19 are rotated and pass alternately through the air and through the excitant. The currents set up tend to dislodge any hydrogen bubbles which may collect on the negative surface. The agitation of the excitant also brings fresh liquid-surfaces into contact with the negative electrodes, and thus reduces polarization. As the rods pass through the liquid they disturb it and cause the spent liquid to be uniformly disturbed, making the whole body of the liquid constantly of the same composition. Besides these results, another series follows: The tubular rods go into the excitant filled with air. This escapes through the perforations and bubbles up through the body of the liquid, oxygenating the same and contributing to the agitation. Some of these bubbles cling to the negative surface and depolarize it by oxygenating or coalescing with the hydrogen. The tubular rods are open at the ends, so that the liquid may readily flow out when they leave the cells. Such liquid as may cling to the rods and may drip off when they reach a higher point of their travel will be caught by the flaring mouths of the slots 10 11. The motor should be of a power sufficient to maintain the rods at a slow speed.

Fairly good results may be obtained by the use of this apparatus with simple acid or alkaline solutions. In practice I adopt the solution mentioned by reason of its high electro-motive force and low resistance. The difficulty heretofore experienced with this solution is its sudden weakening in depolarizing-power, due to an exhaustion of unstable oxygen in the film in contact with the negative surface and lack of means for producing a fresh film. The introduction of air into this solution seems also to enliven the spent liquid.

If desired, a series of perforations might be located on the side of the tubular rods, as indicated in dotted lines at 25, Fig. 2, so as to discharge the entrapped air more directly against the negative surface.

Having thus described my invention, what I claim as new, and desire to secure by Letters Patent, is—

1. In a galvanic battery, the combination, with positive and negative electrodes, of a rotating agitator adapted to pass through the excitant between the electrodes, and a motor for driving said agitator.

2. In a galvanic battery, the combination, with positive and negative electrodes, of a rotatory agitator adapted to pass alternately through the excitant and the air, said agitator being provided with recesses to convey air into the excitant, and a motor for driving said agitator.

3. In a galvanic battery, the combination, with positive and negative electrodes, of a rotatory agitator adapted to pass alternately through the excitant and the air, said agitator being located between the electrodes and close to the negative electrode, as and for the purpose set forth.

4. An agitator and depolarizer for a galvanic battery, consisting of a series of tubular rods fixed to a spindle and adapted to pass alternately through the liquid and the air, and a motor for rotating the spindle.

5. An agitator for a galvanic battery, consisting of a series of tubular rods fixed radially to a spindle and adapted to pass alternately through the excitant and the air, said rods being open at the outer ends and laterally perforated, and a motor for rotating the spindle.

6. In a galvanic battery, the combination of a series of cells, a common cover for the same, electrodes secured to the cover, slots in the cover, spindle 15, motor for rotating same, and rods 18 19, secured to the spindle and adapted to be rotated through the slots into the excitant and back into the air, as and for the purpose set forth.

In testimony whereof I affix my signature in presence of two witnesses.

DAVID HUMPHREYS.

Witnesses:
ROBT. H. READ,
M. P. CALLAN.